United States Patent
Woolman et al.

(10) Patent No.: US 12,371,117 B2
(45) Date of Patent: Jul. 29, 2025

(54) BICYCLE DOCK SYSTEM

(71) Applicant: SHURTAPE TECHNOLOGIES, LLC, Avon, OH (US)

(72) Inventors: Daniel Woolman, London (GB); Stuart Woolman, Charlotte, NC (US); Heidi Carrion, Avon, OH (US)

(73) Assignee: SHURTAPE TECHNOLOGIES, LLC, Avon, OH (US)

(*) Notice: Subject to any disclaimer, the term of this patent is extended or adjusted under 35 U.S.C. 154(b) by 0 days.

(21) Appl. No.: 17/848,022

(22) Filed: Jun. 23, 2022

(65) Prior Publication Data

US 2022/0410996 A1 Dec. 29, 2022

Related U.S. Application Data

(60) Provisional application No. 63/214,050, filed on Jun. 23, 2021.

(51) Int. Cl.
*B62H 3/12* (2006.01)

(52) U.S. Cl.
CPC ..................... *B62H 3/12* (2013.01)

(58) Field of Classification Search
CPC ... B62H 3/12; B62H 3/00; B62H 3/02; B62H 3/04; B62H 3/10; B62H 3/06; A47B 57/32; A47B 57/34; A47B 47/0083; A47B 57/265; A47B 57/545; A47F 5/04
USPC ...................................................... 211/17–20
See application file for complete search history.

(56) References Cited

U.S. PATENT DOCUMENTS

| | | | | |
|---|---|---|---|---|
| 570,465 A | * | 11/1896 | Hayes ...................... | B62H 3/12 211/47 |
| 588,542 A | * | 8/1897 | Williams ................. | B62H 3/12 211/20 |
| 619,344 A | * | 2/1899 | Pyott ....................... | B62H 3/12 211/18 |
| 625,657 A | * | 5/1899 | Elliott .................... | A61M 25/04 604/104 |
| 672,070 A | * | 4/1901 | Smith ...................... | B62H 3/12 410/3 |
| 3,223,375 A | * | 12/1965 | Bernasconi ........... | B60P 7/0807 410/101 |
| 4,183,452 A | * | 1/1980 | MacDonald, Jr. ........ | B60R 9/08 224/511 |
| 4,416,379 A | * | 11/1983 | Graber .................... | B62H 3/12 211/94.01 |

(Continued)

FOREIGN PATENT DOCUMENTS

| CN | 209159863 U | * | 7/2019 | |
|---|---|---|---|---|
| CN | 111086576 A | * | 5/2020 | ............... B62H 3/12 |

(Continued)

OTHER PUBLICATIONS

KR20120050026 translation (Year: 2012).*
English translation for CN-111086576 (Year: 2020).*

*Primary Examiner* — Hiwot E Tefera
(74) *Attorney, Agent, or Firm* — Lippes Mathias LLP

(57) ABSTRACT

A bicycle dock system that includes a mounting body and a brace wherein the mounting body and brace are configured for mounting to a wall or ceiling. The mounting body includes a bearing sleeve, a shaft, an arm, and a support member adapted for engagement of a bicycle tire. The brace includes a radially curved body that is adapted to engage a bicycle tire.

7 Claims, 16 Drawing Sheets

(56) References Cited

U.S. PATENT DOCUMENTS

| | | | | |
|---|---|---|---|---|
| 5,078,276 A * | 1/1992 | Rogge | B62H 3/12 248/289.11 |
| 5,447,241 A * | 9/1995 | Bureau | B62H 3/02 211/5 |
| 5,772,048 A * | 6/1998 | Sopcisak | B62H 3/00 211/20 |
| 5,941,397 A * | 8/1999 | Buchanan | B62H 3/12 211/19 |
| 6,092,787 A * | 7/2000 | Nayman | B25H 1/0014 254/10 R |
| 7,841,575 B1 * | 11/2010 | Sliger | F16M 13/005 248/688 |
| 8,002,225 B1 * | 8/2011 | Malone | A47B 81/00 248/339 |
| 9,073,492 B1 * | 7/2015 | Shen | B60R 9/10 |
| 10,501,023 B1 * | 12/2019 | Mayers | B60R 9/10 |
| 11,142,271 B1 * | 10/2021 | Gu | B62H 3/06 |
| 11,225,296 B1 * | 1/2022 | Gu | B62H 3/08 |
| 11,578,833 B2 * | 2/2023 | Woolman | F16M 13/02 |
| 2006/0289714 A1 * | 12/2006 | Boklund-Moran | A47G 29/083 248/339 |
| 2007/0271806 A1 * | 11/2007 | Dressler | G01B 3/10 33/758 |
| 2015/0151802 A1 * | 6/2015 | Lang | B62H 3/06 248/674 |
| 2016/0059917 A1 * | 3/2016 | Hudson, Jr. | B62H 3/06 248/278.1 |
| 2016/0280296 A1 * | 9/2016 | Greenblatt | B62H 3/02 |
| 2017/0219161 A1 * | 8/2017 | Dempsey | A47G 1/164 |
| 2018/0231176 A1 * | 8/2018 | Sabounjian | A47F 5/0838 |
| 2021/0091817 A1 * | 3/2021 | Heroux | H04B 1/3888 |

FOREIGN PATENT DOCUMENTS

| | | | | |
|---|---|---|---|---|
| KR | 20120050026 A | * | 5/2012 | B62H 3/12 |
| KR | 20120109823 A | * | 10/2012 | B62H 3/04 |
| WO | WO-2019141969 A1 | * | 7/2019 | A47B 96/06 |

* cited by examiner

BICYCLE DOCK SYSTEM

The present application claims the benefit of U.S. Provisional Application Ser. No. 63/214,050 filed Jun. 23, 2021, the contents of which are herein incorporated by reference.

BACKGROUND

The present disclosure relates to a bicycle dock system and method of using the bicycle dock system. However, it is to be appreciated that the present exemplary embodiments are also amenable to other like applications.

Bicycle owners often find it difficult to store their bicycles due to lack of storage space, ease of access, and/or cumbersome bicycle storage options. Current bicycle storage options require a bicycle owner to choose between ease of access and amount of space used for storage.

There is a need for a space saving and easily mountable bicycle dock system.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

The present disclosure relates to a bicycle dock system.

Generally speaking, the present system contemplates the use of a wall mounted system in combination with the floor supporting a meaningful weight of a bicycle.

The dock system includes a mounting body wherein the mounting body has a front surface and a rear surface configured for mounting to a wall or ceiling. The mounting body includes a bearing sleeve on the front surface, a shaft, an arm, and a support member adapted for engagement of a bicycle tire.

the mounting surface. The method may include securing the mounting body to the upper mounting bracket assembly. The method may include fastening the lower mounting bracket assembly to the mounting surface. The method may include securing the brace to the lower mounting bracket assembly. The method may include positioning the bicycle such that the first tire engages the mounting body, and the second tire engages the brace.

The method may include rotating the bicycle relative to the mounting surface. For example, it is possible to rotate the bicycle 30°.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
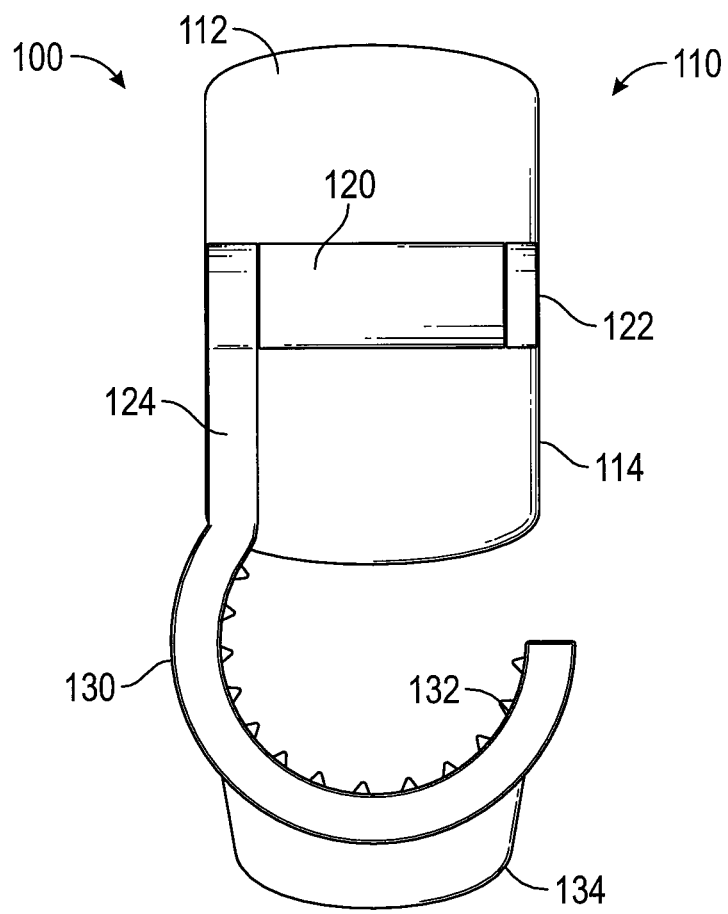
FIG. 1A is a front view of a bicycle dock system having a mounting body.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a bicycle dock system and method of using the bicycle dock system. The dock system is comprised of a mounting body that is vertically aligned with a brace. The mounting body has a rear facing surface configured for mounting to a vertical surface or horizontal surface such as a wall or ceiling, respectively. The mounting body has a support member disposed on a front facing surface. The brace has a rear facing surface configured for mounting to a wall or ceiling. The rear faces of the mounting body and the brace may be configured to slide over one or more mounting bases secured to the wall or ceiling in advance. In the following embodiments of the present disclosure the vertical surface forms the Z-Y plane in a hypothetical X-Y-Z axis.

Figure 1B:
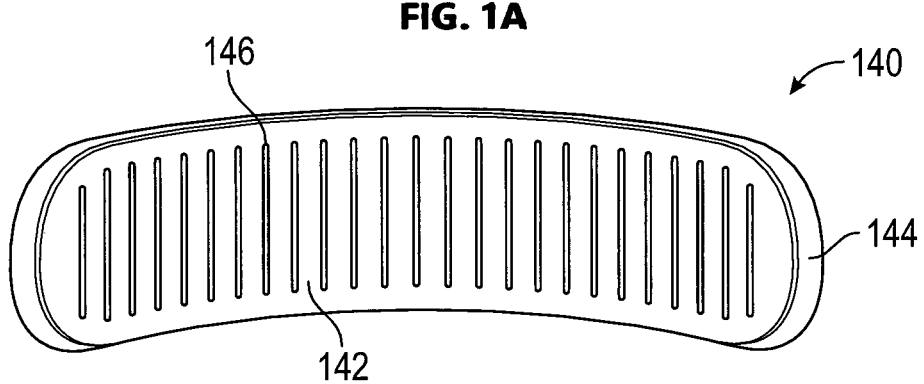
FIG. 1B is a brace in accordance with some embodiments of the present disclosure.

FIGS. 1A and 1B depict a dock system 100 in accordance with some embodiments of the present disclosure. As shown, the dock system 100 includes a mounting body 110 that is vertically aligned with a brace 140. The mounting body 110 includes a front surface 112 and a rear surface 114. The rear surface 114 includes a mounting feature configured for mounting to a wall or ceiling. The mounting feature may include fasteners, mounting brackets, pins, adhesives, apertures, or a combination thereof. The front surface 112 includes a bearing sleeve 120 that extends horizontally across a length of the front surface 114. The bearing sleeve 120 is generally cylindrical shaped and is configured to receive a shaft 122. The shaft 122 is configured such that it is rotatable inside the bearing sleeve 120. The front surface 112 further includes an arm 124. A first end of the arm 124 is secured to an end of the shaft 122. The second end of the arm 124 includes a support member 130.

The support member 130 is configured for engagement with a tire of a bicycle. The support member 130 is depicted as a curved hook however, it is to be appreciated that in further embodiments the support member 130 can be configured in other designs to receive at least one bicycle tire such as a series of hooks; a rectangular hook; a triangular hook; a horizontal bar perpendicular to the arm; or a series of waves and/or loops for receiving a plurality of bicycle tires in each wave and/or loop. The inner surface of the support member 130 includes a friction engagement feature 132. The outer surface of the support member 130 includes a lifting interface 134 extending therefrom. In an exemplary embodiment, the lifting interface 134 is generally tab shaped. However, in further embodiments the lifting interface 134 can be configured in other hand engagement features such as a handle, a loop, or a lever.

Still referring to FIG. 1B, the brace 140 includes a front surface 142 and a rear surface 144. The brace 140 is radially curved such that it is adapted for engagement with a tire. In an exemplary embodiment, the radially curved brace 140 is configured such that a bicycle tire can be rotated at ±30° (degrees) relative to the Z-axis of the mounting surface. The front surface 142 includes a friction engagement feature 146. The rear surface 144 includes a mounting feature configured for mounting to a mounting surface such as a wall or ceiling. The mounting feature may include fasteners, mounting brackets, pins, adhesives, apertures, or a combination thereof.

The mounting body 110, bearing sleeve 120, shaft 122, arm 124, support member 130, and brace 140 may include the same or different plastic materials (optionally reinforced with a filler material such as glass fibers). Non-limiting examples of plastic materials include polyamides, polycarbonates, polyolefins (e.g., polyethylene, polypropylene), acrylonitrile butadiene styrene (ABS) polymers, polyethylene terephthalate (PET), polybutylene terephthalate (PBT), and polyvinyl chloride (PVC).

The friction engagement features 132, 146 may include an elastomeric material. Non-limiting examples of elastomeric materials include thermoplastic elastomer, polyisoprene, polybutadiene, chloroprene rubber, butylrubber, styrene-butadiene rubber, nitrile rubber, ethylene propylene rubber (EPM), ethylene propylene diene rubber (EPDM), epichlorohydrin rubber, polyacrylic rubber, silicone rubber, fluorosilicone rubber, fluoroelastomers, perfluoroelastomers, polyether block amides, and chlorosulfonated polyethylene.

The fasteners may include a high strength material such as a metal (e.g., steel).

Figure 2A:
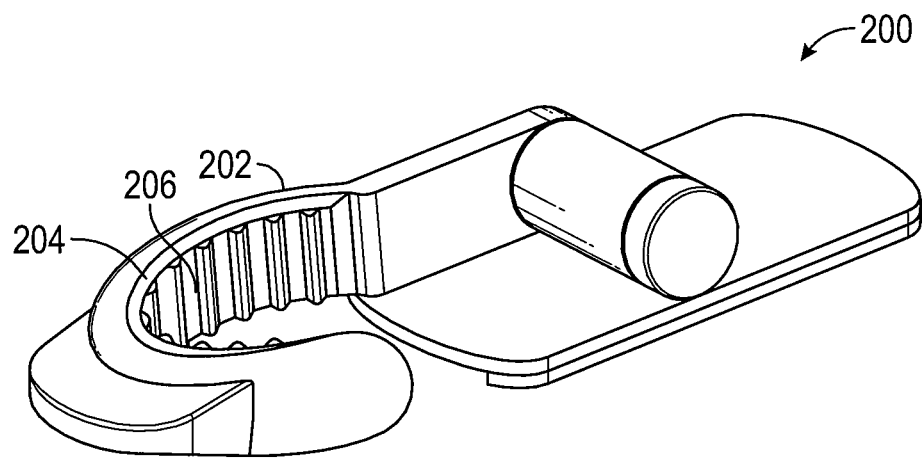
FIG. 2A is a perspective view of a mounting body of a bicycle dock system in accordance with some embodiments of the present disclosure.
Figure 2B:
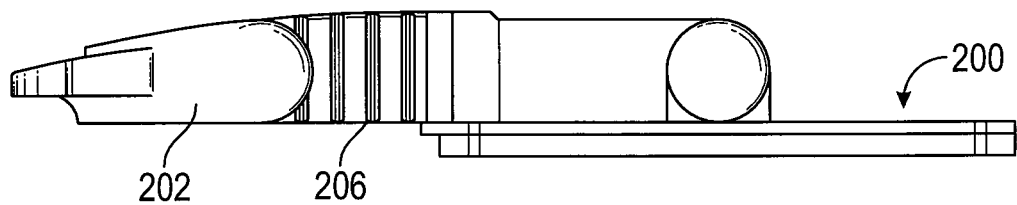
FIG. 2B is a perspective side view of the mounting body of the bicycle dock system in FIG. 2A.

FIGS. 2A-B illustrate an embodiment of a mounting body 200 including a support member 202. The inner surface 204 of the support member 202 includes a friction engagement feature 206. In the illustrated embodiment the friction engagement feature 206 comprises an elastomeric material.

Figure 3A:
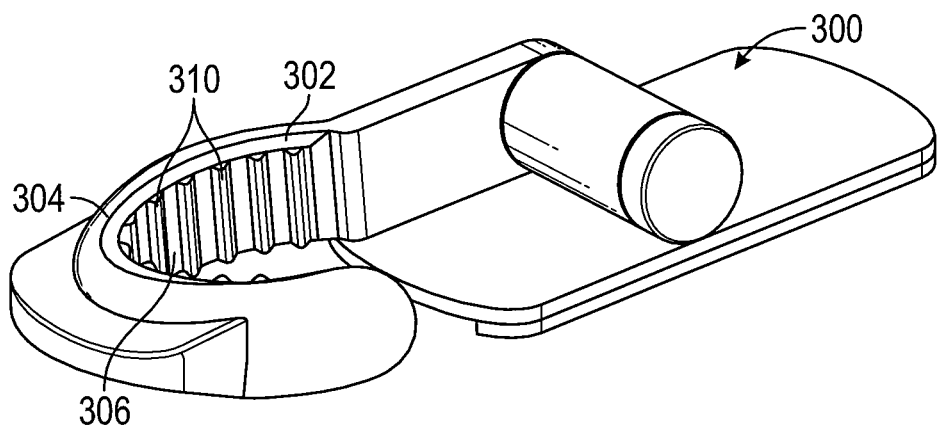
FIG. 3A is a perspective view of a mounting body of a bicycle dock system in accordance with some embodiments of the present disclosure.
Figure 3B:
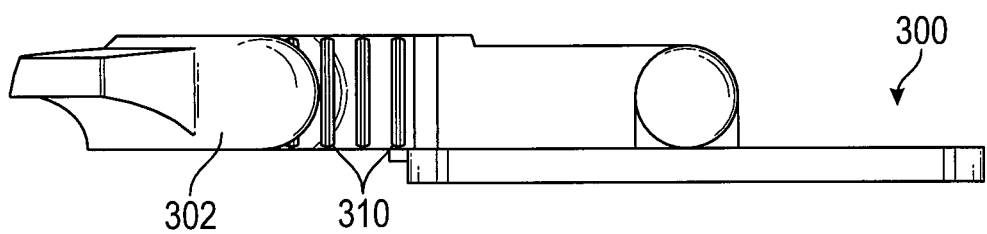
FIG. 3B is a perspective side view of the mounting body of the bicycle dock system in FIG. 3A.

FIGS. 3A-B illustrate an embodiment of a mounting body 300 including a support member 302. The inner surface 304 of the support member 302 includes a friction engagement feature 306. In the illustrated embodiment the friction engagement feature 306 includes an elastomeric material having a plurality of ribs 310 circumferentially positioned along the inner surface 304 of the support member 302.

Figure 4:
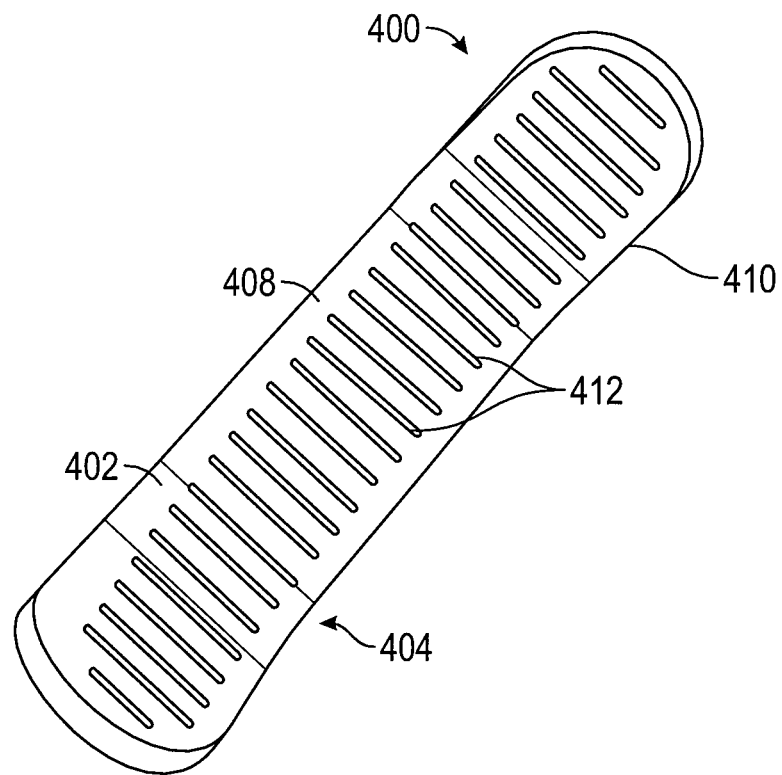
FIG. 4 is a perspective view of a brace of the bicycle dock system in accordance with some embodiments of the present disclosure.

FIG. 4 illustrates an embodiment of a brace 400 including a front surface 402 and a rear surface 404. The brace 400 has a radially curved body 410 such that it can receive a bicycle tire. The front surface 402 includes a friction engagement feature 406. In the illustrated embodiment the friction engagement feature may include an elastomeric layer 408. The radially curved body 410 may include a plurality of ribs 412 circumferentially positioned along the elastomeric layer 408. In further embodiments, it is to be appreciated that the brace 400 may be configured to receive more than one tire. Further it is to be appreciated that in other embodiments the brace 400 is shaped in other geometric shapes such as a rectangle with an open face opposite to the mounting surface; a trapezoid with an open face opposite to the mounting surface; and/or a rhombus with an open face opposite to the mounting surface.

It is to be appreciated that in further embodiments a friction engagement feature may include other frictional elements such a recesses, waves, loops, channels, and/or extrusions.

Figure 5:
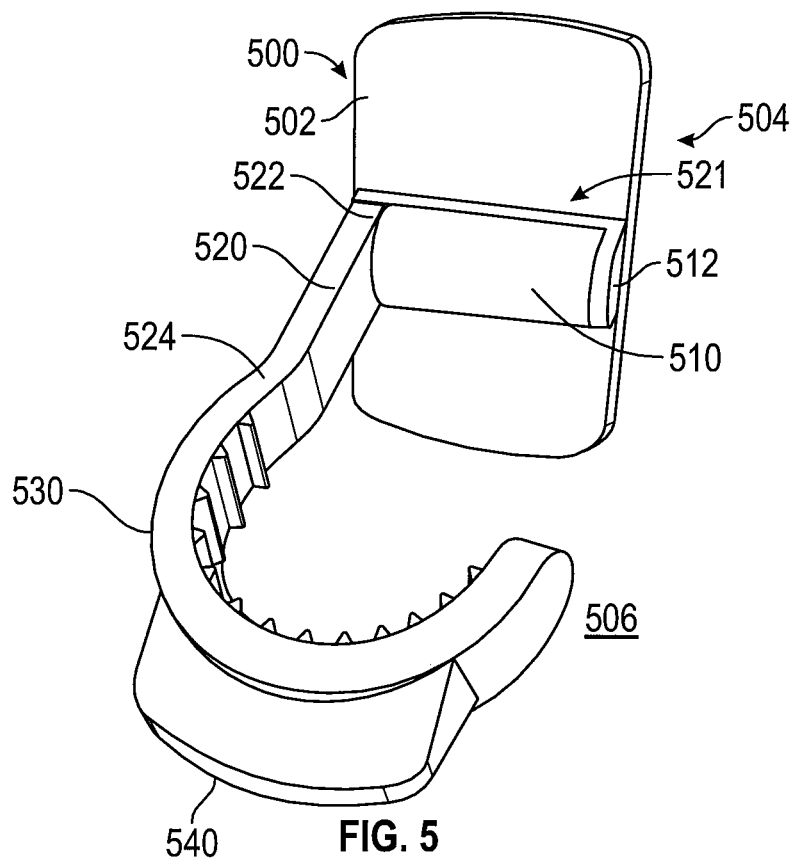
FIG. 5 is a perspective view of a mounting body of the bicycle dock system in an open configuration in accordance with some embodiments of the present disclosure.

FIG. 5. illustrates a mounting body 500 in an open configuration. The mounting body 500 includes a front surface 502 and a rear surface 504. The rear surface 504 includes a mounting feature configured for mounting to a mounting surface 506 such as a wall or ceiling. The mounting feature may include fasteners, mounting brackets, pins, apertures, or a combination thereof.

The front surface 502 includes a bearing sleeve 510 that extends horizontally across a length of the front surface 502. A shaft 512 is disposed in the bearing sleeve 510 and is rotatable therein. The front surface 502 further includes a lever arm 520. A first end 522 of the lever arm 520 is secured to the shaft 512. A support member 530 is disposed at a second end 524 of the lever arm 520. The support member 530 is generally hook shaped. The support member 530 further includes a tab 540 extending therefrom.

The lever arm 520 rotates relative to the Y-axis of the mounting surface 506. The lever arm 520 includes a flat closed position and at least three different open positions. The lever arm 520 is retained in one of the open positions by an engagement feature and a plurality of corresponding receiving features (e.g. an internal ratchet arrangement 521).

In an exemplary embodiment the lever arm 520 can have an engagement feature that engages a plurality of receiving features on the front surface 502 of the mounting body 500. In this exemplary embodiment, the lever arm 520 can move through at least four different positions including a flat closed position; a first open position at 30°; a second open position at 60°; and a third open position at 90°. It is to be appreciated that in further embodiments the position of the lever arm 520 can be set at any desired angle between 0° and 180° relative to the mounting surface 506 depending on the positioning of supported bicycle whereby the weight of the bicycle will retain the lever arm 520 in the desired open configuration.

In further embodiments the lever arm 520 may include at least two open positions, or at least one open position. It is to be appreciated that in further embodiments the support member 530 may rotate around an axis relative to the lever arm 520. The engagement feature can be a clip, a pin, an extrusion, a fastener, a clip, an arm, a hook, etc. The receiving features can be a plurality of notches, grooves, apertures, slots, hooks, etc.

Figure 6:
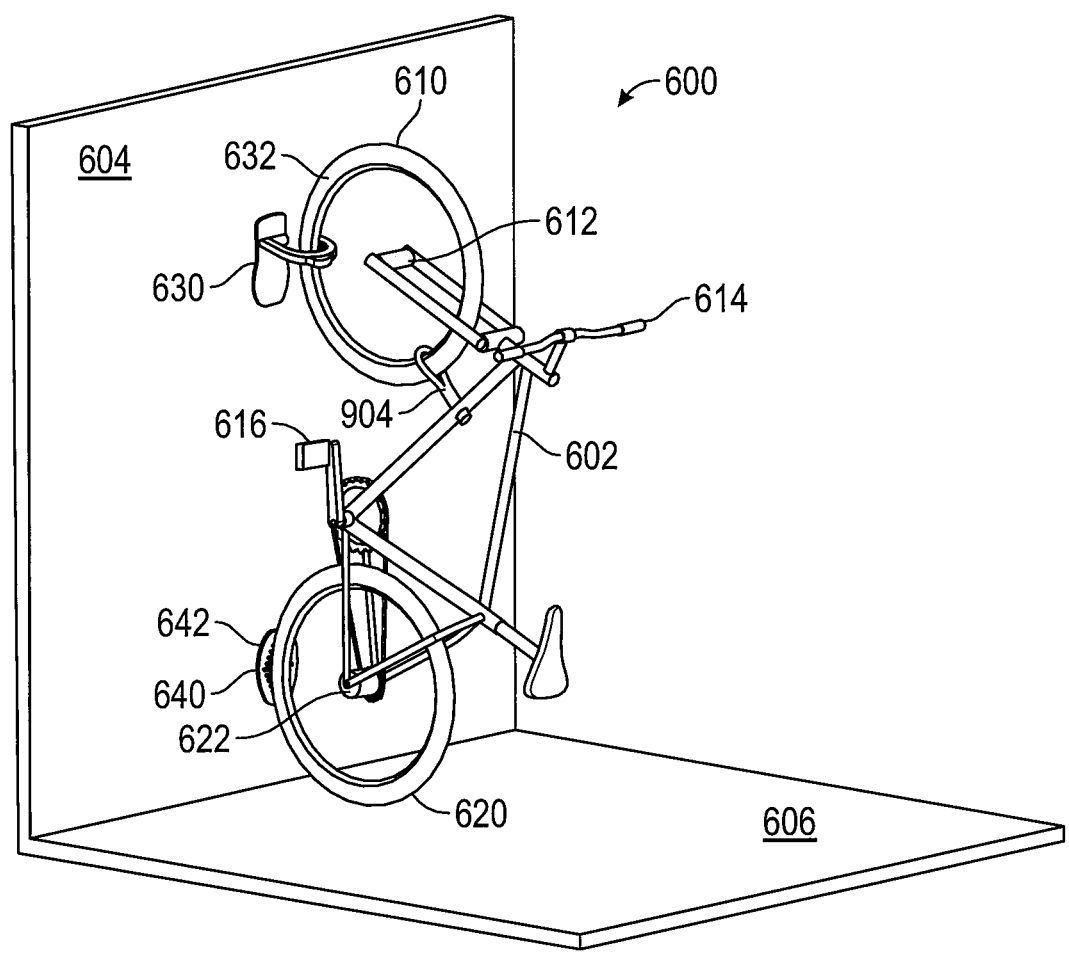
FIG. 6 is a perspective view of an exemplary mounting configuration of the mounting body of the bicycle dock system in accordance with some embodiments of the present disclosure.

FIG. 6 illustrates an exemplary mounting configuration for a mounting dock system 600. The mounting dock system 600 is configured to receive a bicycle 602 and is mounted to a vertical surface 604. The bicycle 602 includes a first and second tire 610, 620, a first and second axle 612, 622, a handlebar 614, and pedals 616. The mounting dock system is configured in such a way that the trailing edge of the second tire 620 is resting on a horizontal surface 606 perpendicular to the vertical surface 604. Mounting dock system 600 includes a mounting body 630 and a brace 640. The mounting body 630 includes a support member 632 that is adapted for engagement with the first tire 610. The brace 640 includes a radially curved body 642 that is adapted for engagement with a second tire 620.

Figure 7:
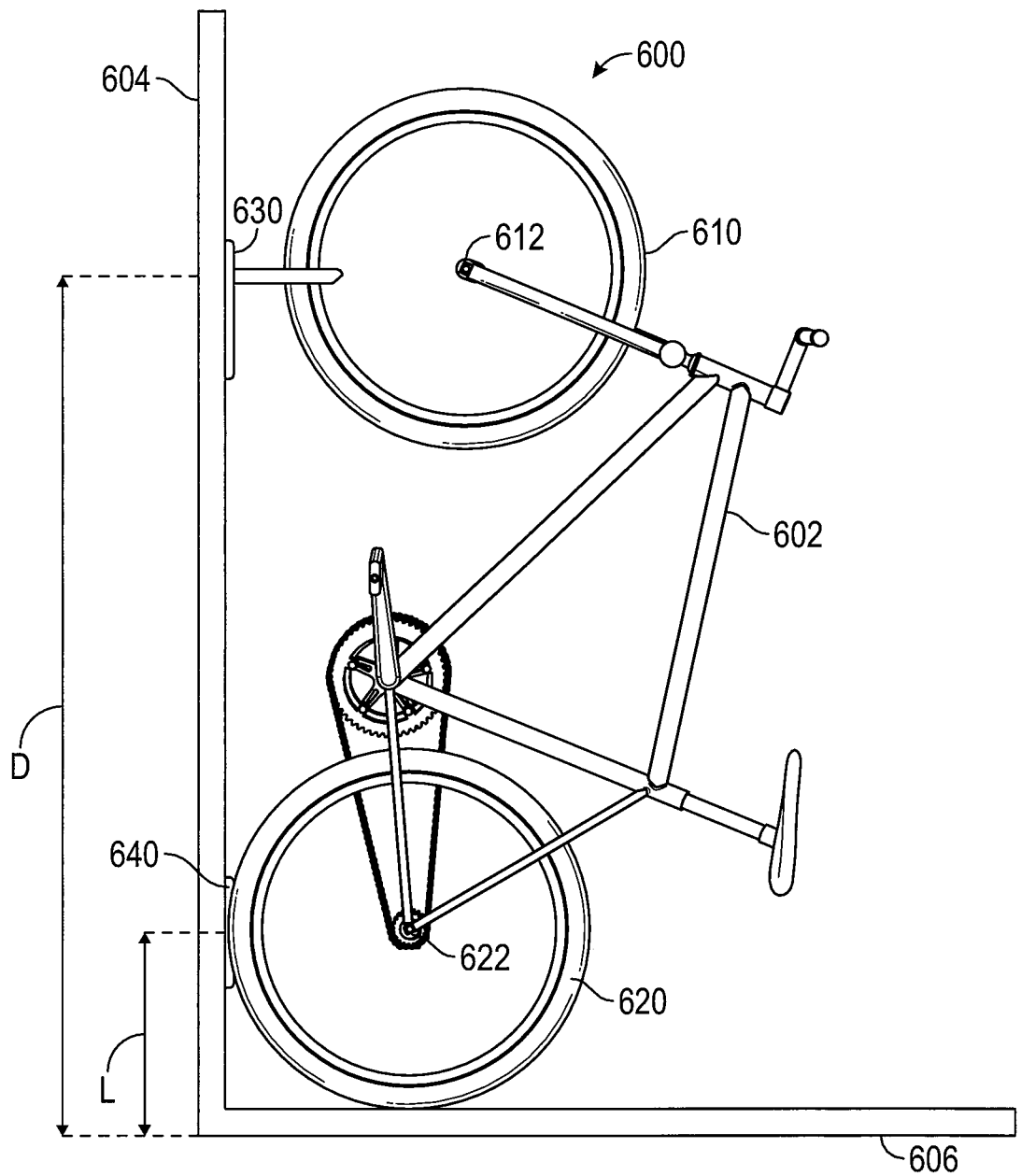
FIG. 7 is a side view of the exemplary mounting configuration of the mounting body of the bicycle dock system in FIG. 6.

FIG. 7 depicts a side view of the mounting configuration of the mounting dock system 600. A method for installing the mounting configuration of the mounting dock system 600 includes the following steps. In step 1, measure a distance (D) from the first axle 612 to the leading edge of the second tire 620. Alternatively, measure a distance from the first axle 612 to the second axle 622 and add a length (L) of the radius of the second tire 620 to the measurement of the axles. In step 2, mark the measured distance (D) on the vertical surface 604 measured from the point where the horizontal surface 606 and vertical surface 604 meet. In step 3, mark the length (L) of the radius of the second tire on the vertical surface 604 measured from the point where the horizontal surface 606 and vertical surface 604 meet and then vertically align the marked length (L) with the marked distance (D). In step 4, align the center point of an upper mounting bracket assembly with the marked distance (D). In step 5, fasten the upper mounting bracket assembly centered on the marked distance (D). In step 6, affix the mounting body 630 to the upper mounting bracket assembly. In step 7, align the center point of a lower mounting bracket assembly with the marked length. In step 8, fasten the lower mounting bracket assembly centered on the marked length (L). In step 9, affix the brace 640 to the lower mounting bracket assembly. In step 10, insert the bicycle 602 such that the first tire 610 engages the mounting body 630 and the second tire 620 engages the brace 640. In an exemplary embodiment following this method for installing the mounting configuration of the mounting dock system 600, the second tire 620 is in contact with the horizontal surface 606 whereby the mounting dock system 600 supports a substantial portion of the weight of the bicycle 602 but does not support the entire weight of the bicycle 602.

Figure 8:
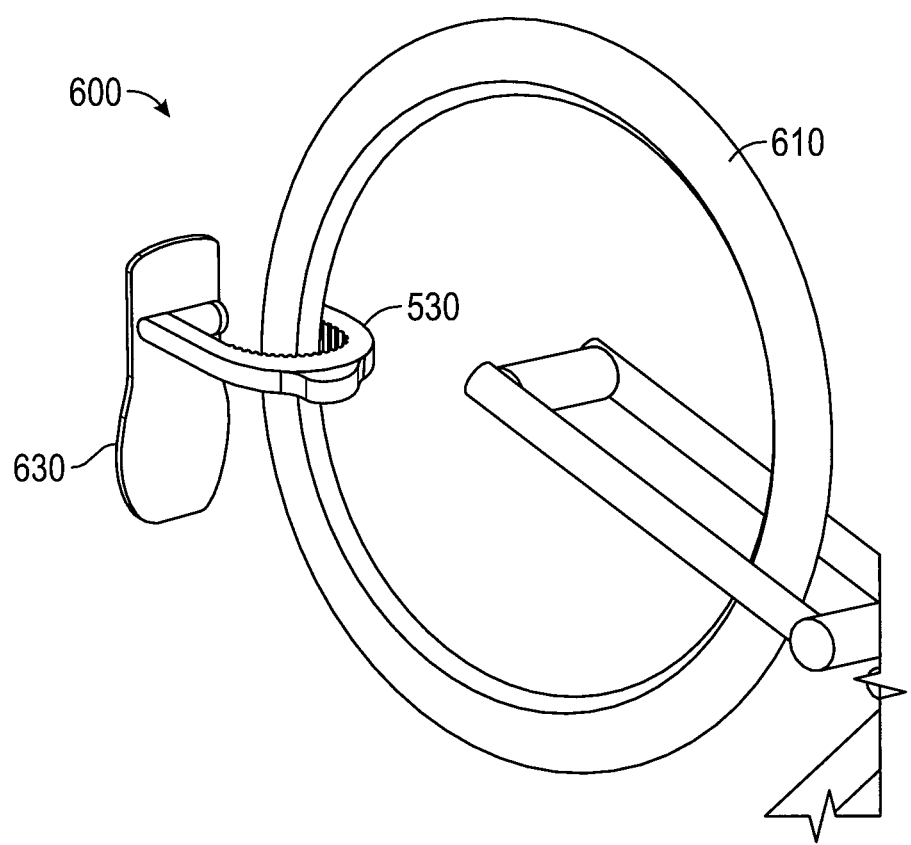
FIG. 8 is a focused in perspective view of the front tire of the mounting configuration in FIG. 6.

FIG. 8 is a focused view of a portion of the mounting configuration of the mounting dock system 600 showing the mounting body 630 engaging the first tire 610, wherein the hook portion of the support member 530 is positioned between spokes (not shown) of the bicycle tire 610.

Figure 9:
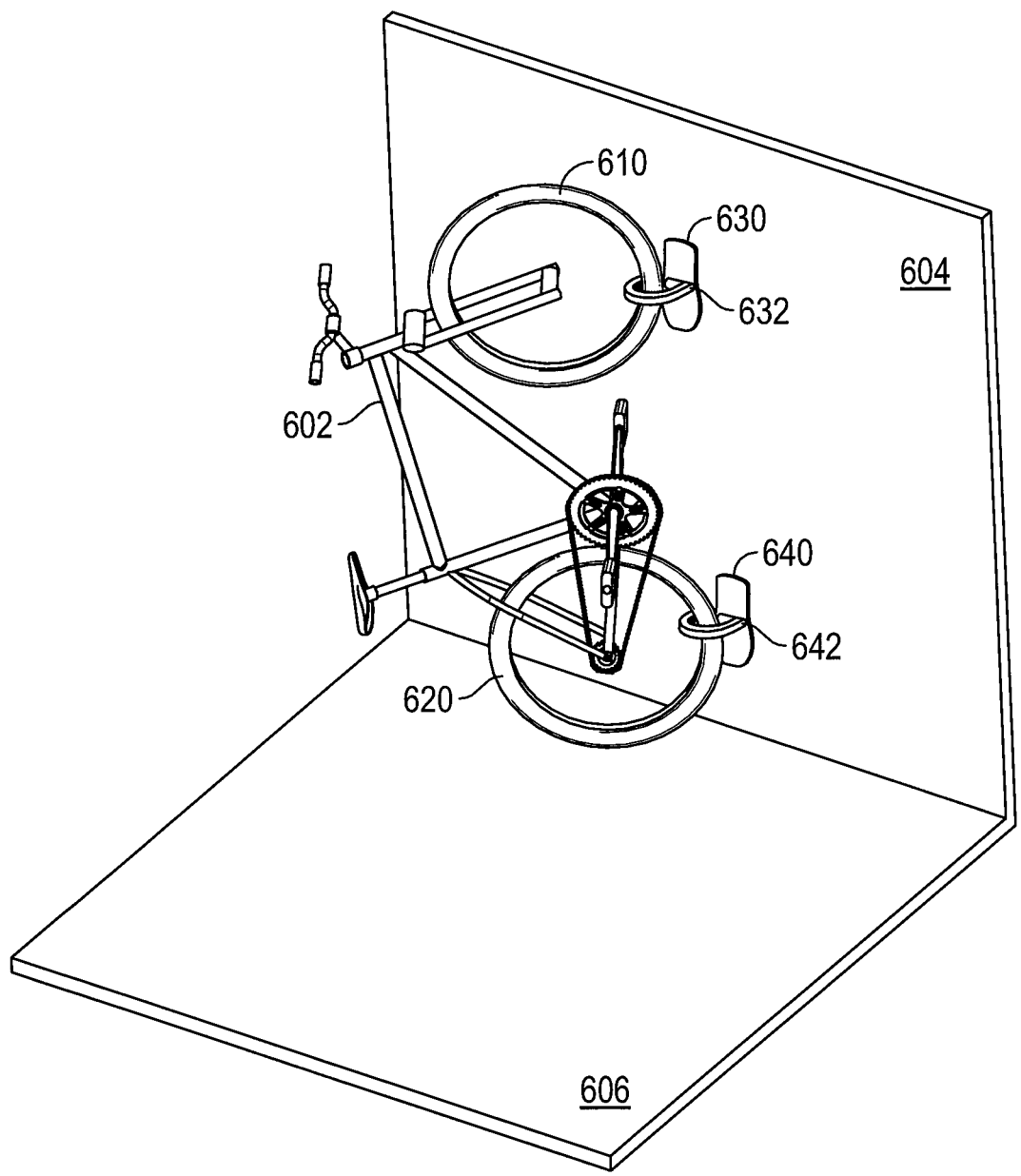
FIG. 9 is a perspective view of a mounting configuration of a bicycle dock system in accordance with some embodiments of the present disclosure.

FIG. 9 illustrates a storage orientation of the bicycle 602 is rotated at least 30° relative to the Y-axis of the mounting surface. As the bicycle 602 is rotated, the first tire 610 continuously engages the support member 632 and the outside edge of the second tire 620 engages the radially curved body 642 of the brace 640. Further, engagement features may be included on the interior surface of the support member 632 and the radially curved body 642 to secure the bicycle 602 in its rotated orientation.

Figure 10:
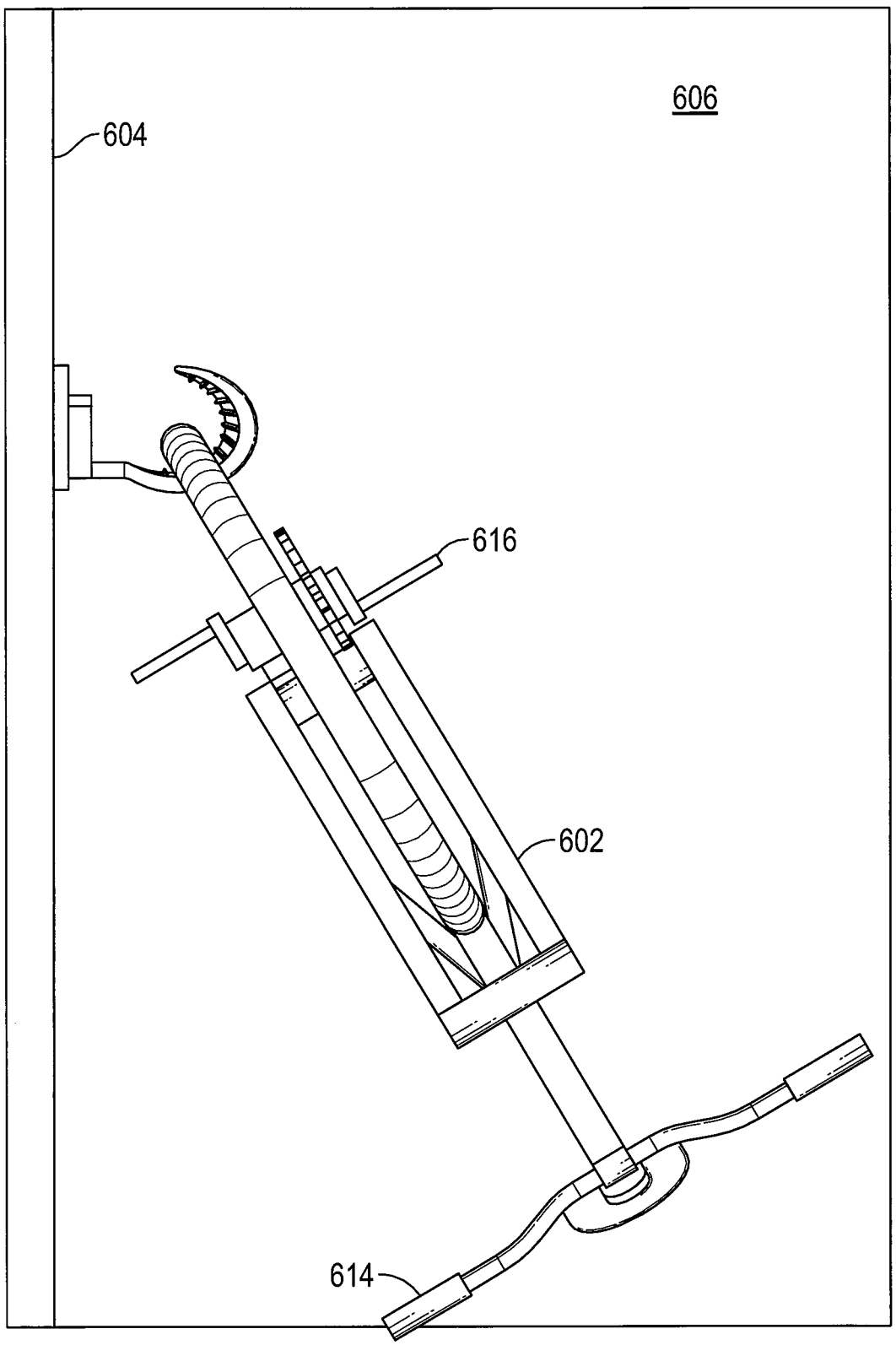
FIG. 10 is a top view of the mounting configuration in FIG. 9.

FIG. 10 is a top-down view of the storage orientation of the bicycle 602. In the illustrated exemplary embodiment, the bicycle 602 may rotate at least 30° relative to the Y-axis. In further embodiments the bicycle 602 may rotate until the handlebar 614 or pedals 616 engage the vertical surface 604.

Figure 11:
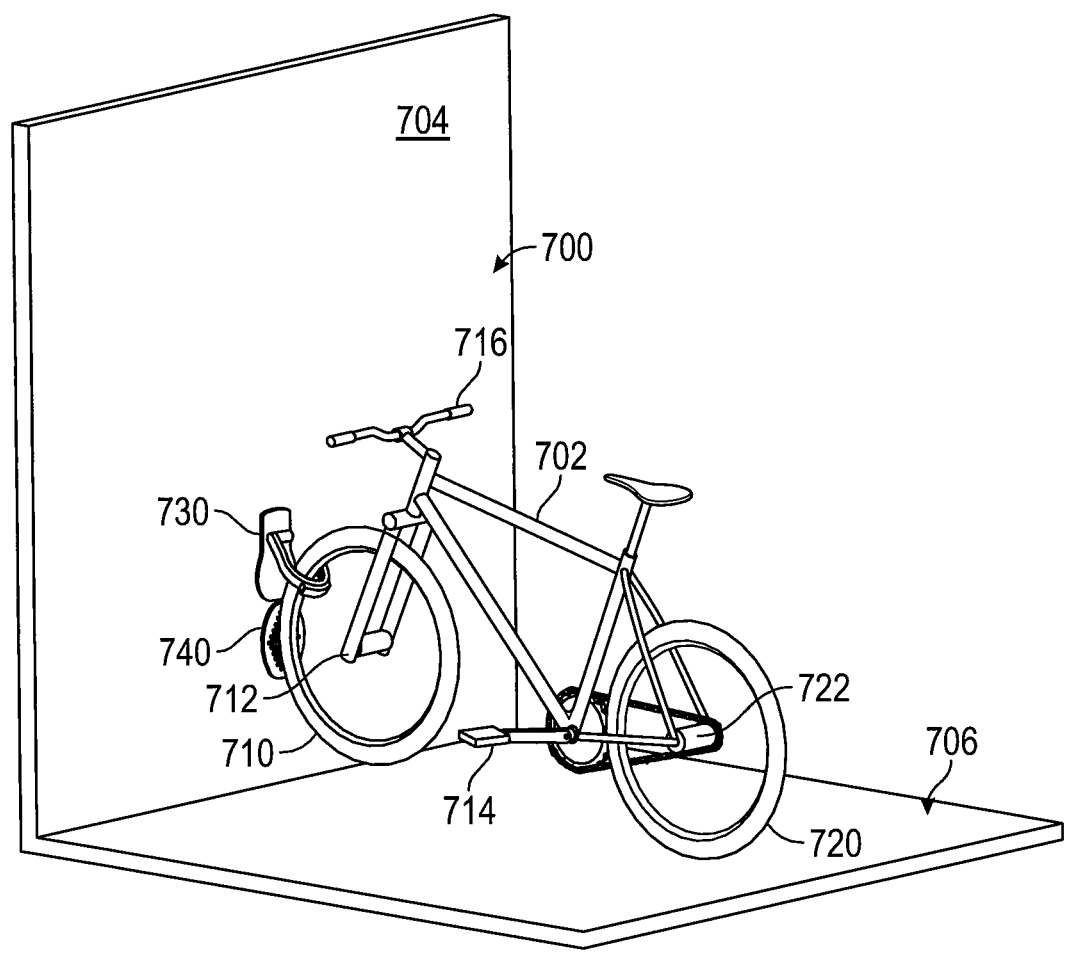
FIG. 11 is a perspective view of a mounting configuration of a bicycle dock system in accordance with some embodiments of the present disclosure.

FIG. 11 illustrates an alternative exemplary mounting configuration for a mounting dock system 700. The mounting dock system 700 is mounted to a vertical surface 704 and is configured to receive a bicycle 702. The bicycle includes a first and second tire 710, 720, a first and second axle 712, 722, a handlebar 714, and pedals 716. The mounting dock system 700 includes a mounting body 730 and a brace 740. The mounting dock system 700 is configured in such a way that the first tire 710 is received by the mounting body 730 and the brace 740. In this mounting configuration the first tire 710 is lifted entirely off a horizontal surface 706 while the second tire 720 remains in contact with the horizontal surface 706.

Figure 12:
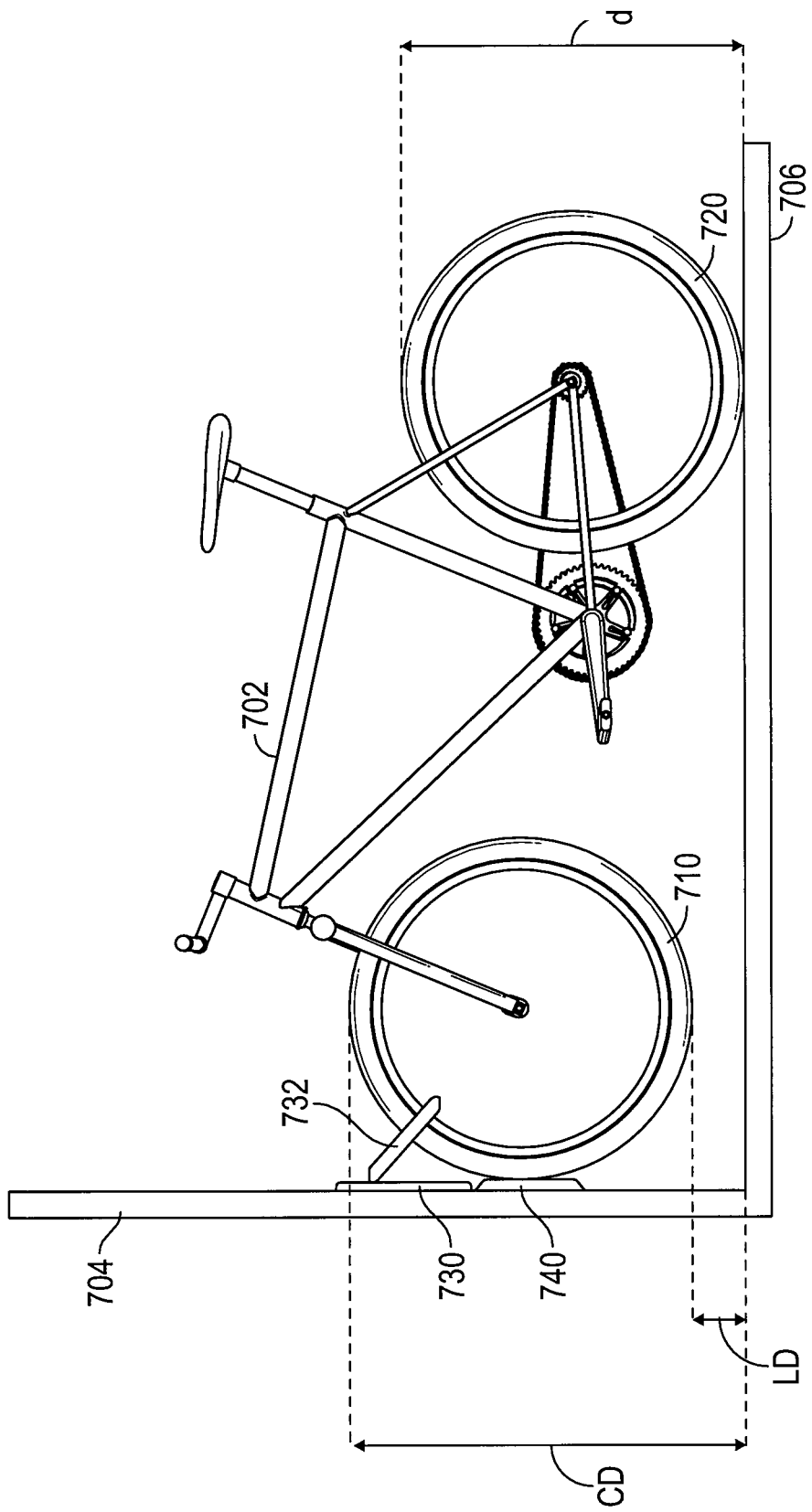
FIG. 12 is side view of the mounting configuration in FIG. 11.

FIG. 12 depicts a side view of the mounting configuration of the mounting dock system 700. A method for installing the mounting configuration of the mounting dock system 700 includes the following steps. In step 1, measure a diameter (d) of the first tire 710. In step 2, determine lift distance (LD) by deciding how many inches you want the first tire 710 lifted off the horizontal surface. In exemplary embodiments the lift distance (LD) is typically between 3 inches and 18 inches. However, it is to be appreciated that the lift distance may be more or less in further embodiments. In step 3, add the determined lift distance (LD) to the measured diameter (d) of the first tire and mark the combined distance (CD) on the vertical surface 704 measured from the point where the horizontal surface 706 and vertical surface 704 meet. In step 4, align the center point of an upper mounting bracket assembly with the marked combined distance (CD). In step 5, fasten the upper mounting bracket assembly centered on the marked combined distance (CD). In step 6, affix the mounting body 730 to the upper mounting bracket assembly. In step 7, position the brace 740 such that the upper edge of the brace 740 and lower edge of the mounting body 730 have at least one inch of separation and mark the center point of the brace 740. In step 8, fasten the lower mounting bracket assembly centered on the marked center point of the brace. In step 9, affix the brace 740 to the lower mounting bracket assembly. In step 10, insert the bicycle 702 such that the first tire 710 engages the mounting body 730 and the brace 740. In an exemplary embodiment following this method for installing the mounting configuration of the mounting dock system 700, the second tire 720 is in contact with the horizontal surface 706 whereby the mounting dock system 700 supports a substantial portion of the weight of the bicycle 702 but does not support the entire weight of the bicycle 702.

Figure 13:
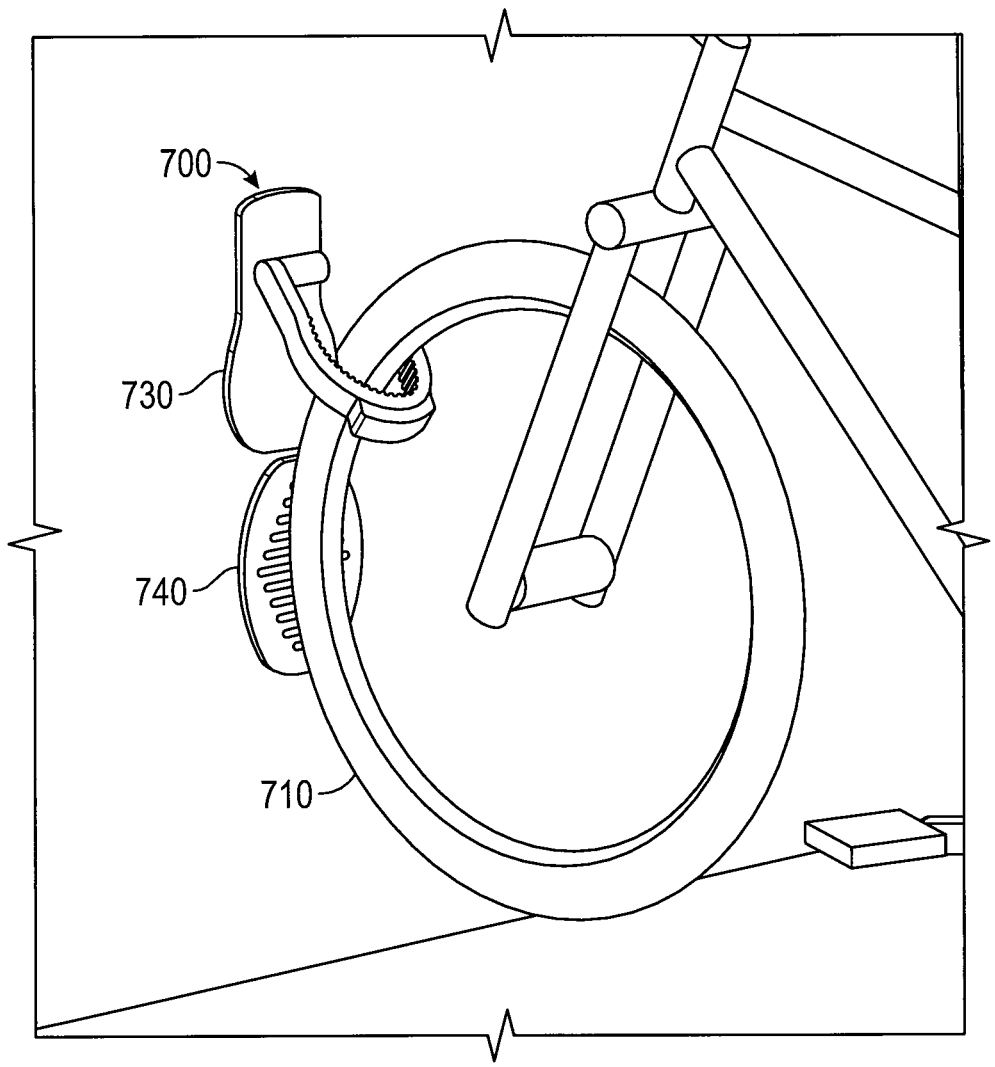
FIG. 13 is a focused in perspective view of the front tire of the mounting configuration in FIG. 11.

FIG. 13 is a focused view of a portion of the mounting configuration of the mounting dock system 700 showing the mounting body 730 and brace 740 engaging the first tire 710.

Figure 14:
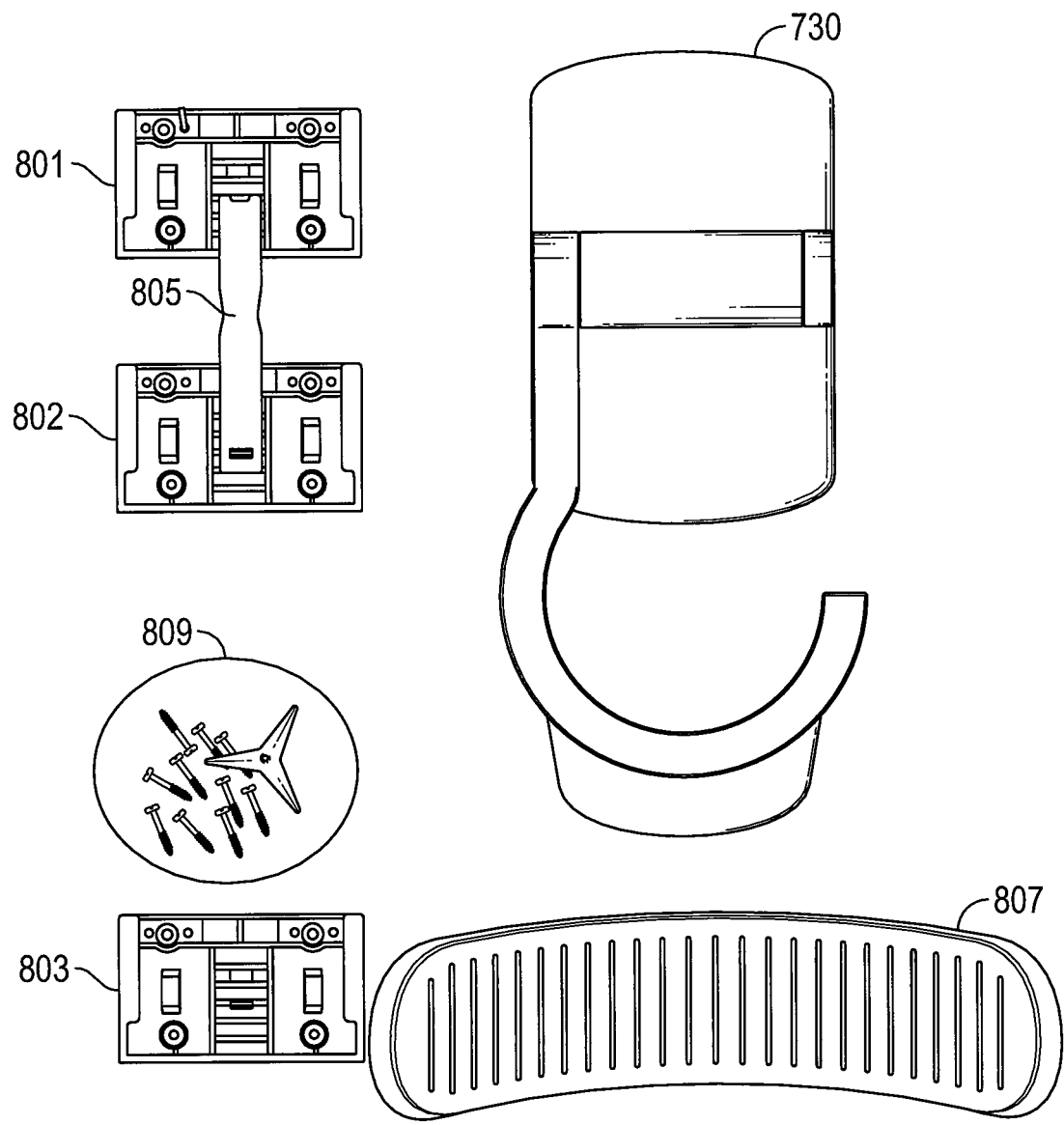
FIG. 14 is a front view of a mounting feature of a mounting body and a brace of a bicycle dock system in accordance with some embodiments of the present disclosure.

FIG. 14 is an illustration of an exemplary mounting substrate for the mounting body 730 and the brace 807. The substrates include mounting units 801, 802 and 803. Spacer element 805 is provided to provide the appropriate distance between mounting units 801 and 802. As installed, mounting units 801 and 802 in combination receive mounting body 730. As installed mounting unit 803 receives brace 807. A plurality of nails and a magnetic insertion tool (collectively 809) is provided for securing the mounting units to a wall.

Non-limiting examples of mounting units and how they may be secured to walls (optionally using templates) are described in WO 2019/141969A1 to Woolman published Jul. 25, 2019, and U.S. Pat. No. 10,143,316 to Will et al. issued Dec. 4, 2018. The contents of these documents are incorporated by reference herein in their entireties. The mounting body and brace of the mounting dock system may be permanently or detachably secured to the mounting brackets. For example, in one embodiment, the mounting body may slidingly engage at least one flange on the mounting brackets.

Figure 15:
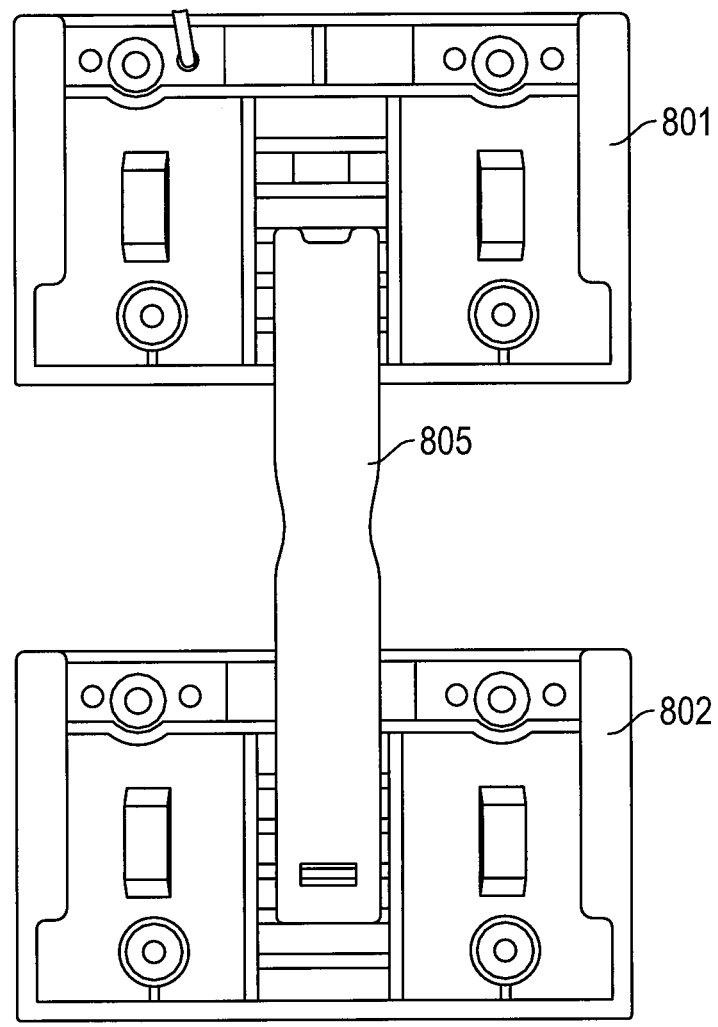
FIG. 15 is a focused front view of the mounting feature of the mounting body in FIG. 14.

FIG. 15 is an illustration of a focused in view of the exemplary mounting units of the mounting substrates.

Figure 16:
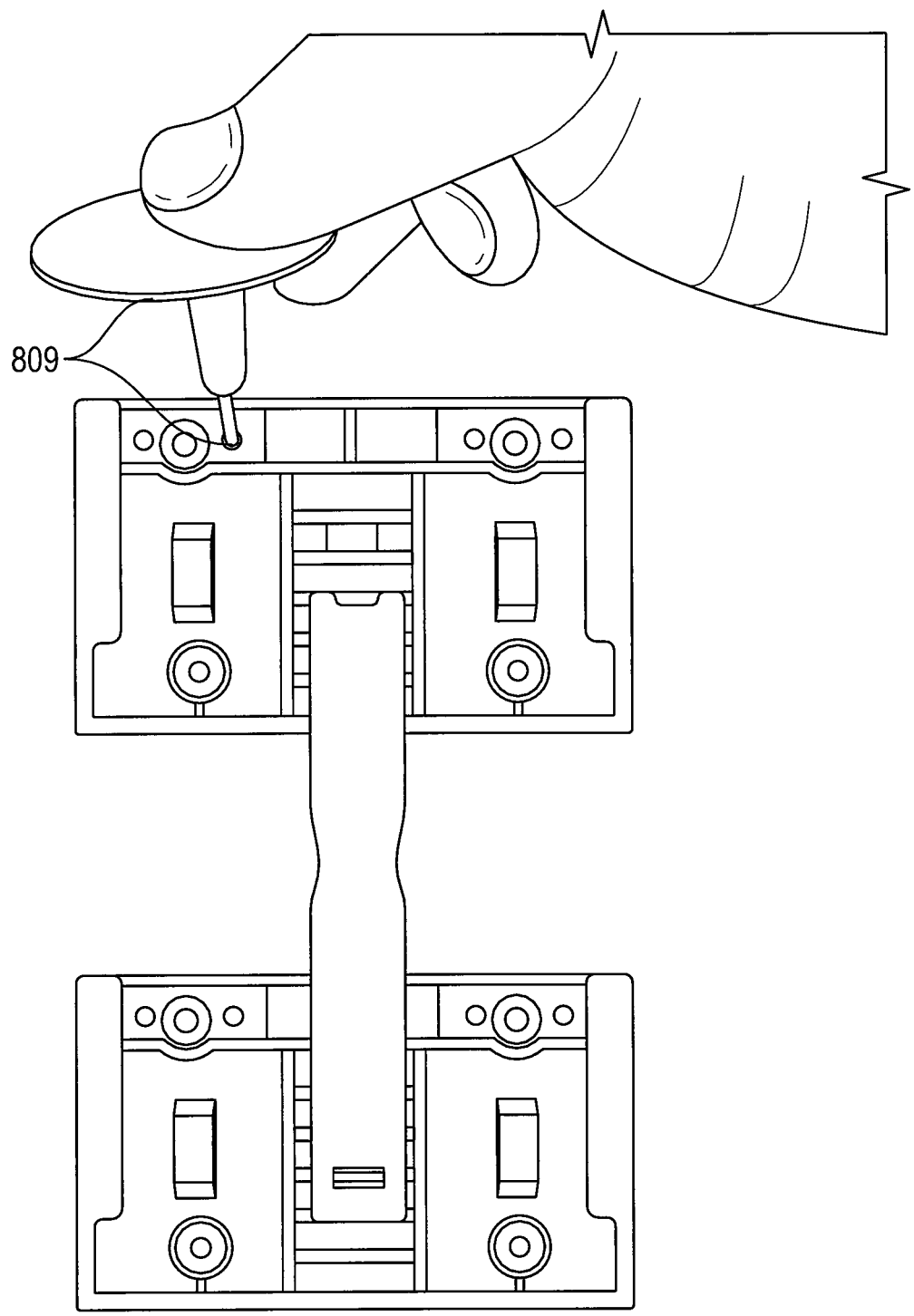
FIG. 16 is front view of a method of installing the mounting feature in FIG. 15.

FIG. 16 is an illustration of an exemplary method of affixing a mounting unit of a mounting substrate to a vertical surface.

Figure 17:
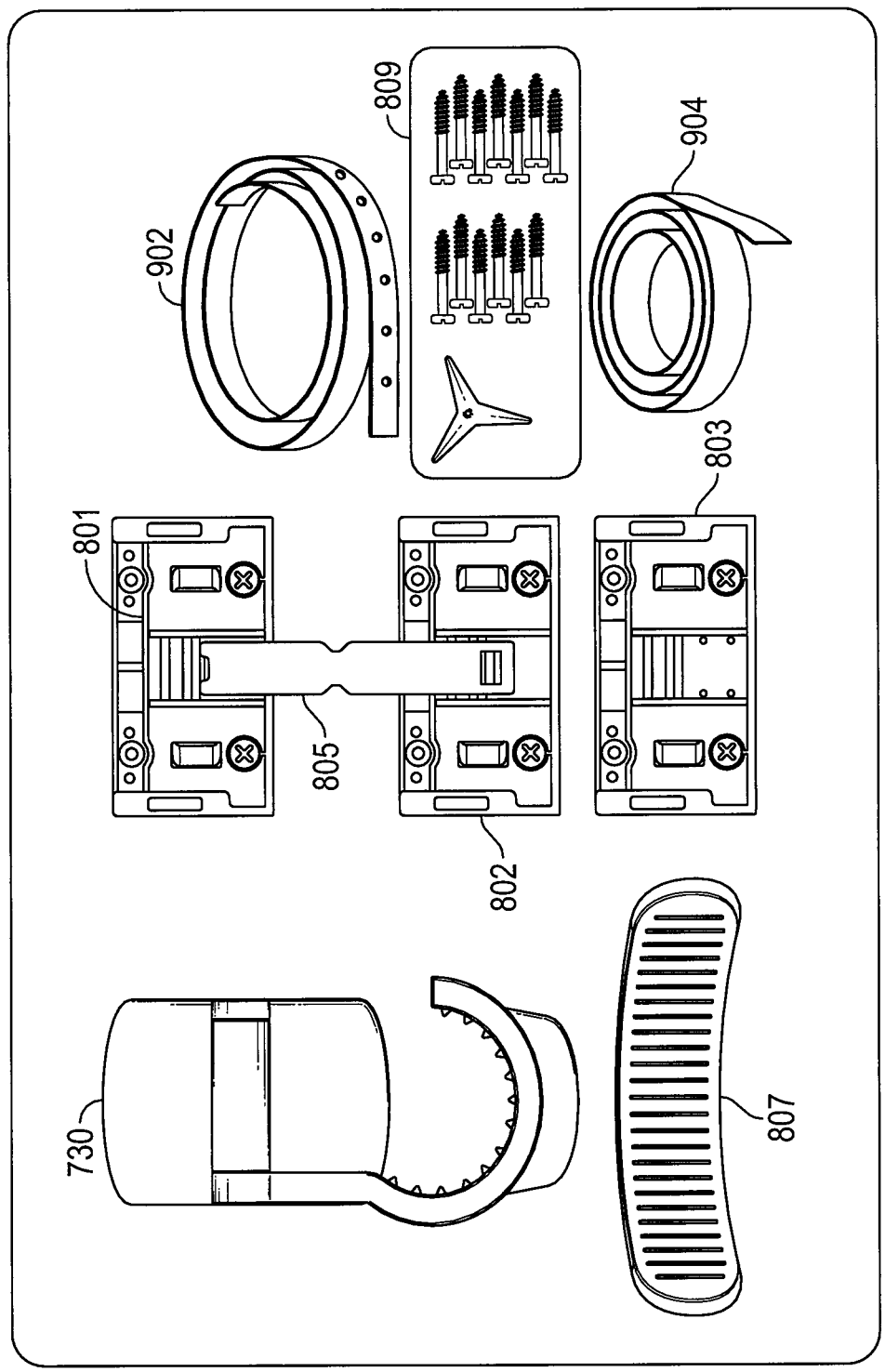
FIG. 17 is an illustration of a kit forming the bicycle dock system.

FIG. 17 illustrates the components of a bicycle dock system kit. The kit 900 includes mounting body 730, brace 807, mounting substrate units 801, 802 and 803 and spacer 805. The kit further includes pins and magnetic insertion tool (collectively 809). In addition, hand-tearable measuring tape 902 and securing strap 904 are provided (see FIG. 6).

Bicycle Dock Installation Example:

Measure Bike: With enclosed measuring tape, align the "leading edge" with the center axle of front tire, extending the tape to an outer edge of the rear tire. Once you've measured the length to the rear tire, tear off the extra length from the measuring tape.

Measure and Mark Wall: With the measuring tape, align the rear tire measurement (torn edge) with the floor and extend the leading end of the measuring tape up the wall.

Align Bases to Mark: Remove release liners of the two bases attached to the spacer. With spacer still attached, position the bases, using the built-in bubble levels on the bases. The center of the spacer (indent marking) should align with the mark on the wall. Stick to the wall and press firmly for 30 seconds.

Secure with Pins: Using the enclosed magnetic helper, insert pins through the holes in each base and into the drywall. Make sure the pins are fully inserted into the wall and the heads are flush with the base.

Remove Spacer and Add Top Hook: Remove spacer by pulling towards you. Slide upper hook over two bases. Make sure unit is secured over both top and bottom bases.

Add Base and Rear Wheel Plate: Using measuring tape again, measure and mark 12" from floor and vertically aligned with the top hook. Remove release liner from remaining base, aligning top of base with the mark. Stick to wall and secure with pins. Slide rear wheel plate over the base.

Bicycle Storage Example:

To store bike, lift the bike dock top hook. Holding bike with both hands on the handlebars, position the rear tire into the rear wheel plate. Thread the upper hook through the front tire spokes. Attach securing strap to front tire and bicycle frame.

Extra Space: For additional space saving in your garage, you can pivot your bike closer to the wall (at an angle). Make sure the rear tire stays in contact with the rear wheel plate.

Alternative Mount Example:

Horizontal Mount Option: For even easier access, you can choose to mount the bike dock upper hook in a lower position. This allows you to keep both bike tires on the floor.

Measure Bike and Stick Template to Wall: With enclosed tape measure, measure your front bike tire. Once you've measured the length, tear off the extra length from the tape measure template.

Mark Wall and Complete Installation: Align the torn edge with the garage floor and extend the leading end of the tape measure template up the wall, marking the top edge. The top of the bases (in spacer) will align to the pencil mark. Secure the bases, slide on top hook, and slide on rear wheel plate and secure the front tire to the tire frame with securing Strap.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for storing a bicycle, the method comprising:
providing a mounting body including a front surface and rear surface, a bearing sleeve disposed on the front surface below a top edge of the mounting body and above a bottom edge of the mounting body, a shaft rotatably disposed in the bearing sleeve, a first end of an arm secured to the shaft and a second end of the arm defining a support member adapted for engagement with a first tire of a bicycle, the arm being rotatable vertically through at least flat, 30°, 60° and 90° relative to the front surface;
providing a brace including a front and rear surface and a radially curved body adapted for engagement with a second tire of the bicycle;
providing an upper mounting bracket assembly and a lower mounting bracket assembly;
vertically aligning the upper mounting bracket assembly and lower mounting bracket assembly on a mounting surface;
fastening the upper mounting bracket assembly to the mounting surface;
securing the mounting body to the upper mounting bracket assembly;
fastening the lower mounting bracket assembly to the mounting surface;
securing the brace to the lower mounting bracket assembly; and
positioning the bicycle such that the first tire engages the mounting body and the second tire engages the brace and a floor.

2. The method of claim 1, wherein the bicycle is rotatable at least ±30° relative to the mounting surface after it is positioned on the mounting body and the brace.

3. The method of claim 1, wherein the support member and the radially curved body both have an inner surface that is lined with a friction engagement feature.

4. The method of claim 3, wherein the friction engagement features of the support member and the radially curved body engage the first and second tires of the bicycle.

5. The method of claim 1, wherein the support member is generally hooked shaped.

6. The method of claim 1, wherein the support member has an inner surface that is lined with a friction engagement feature selected from a plastic more resilient that a main body of the support member, a contoured surface, or a combination thereof.

7. The method of claim 1 wherein the support member includes an outer surface having a tab extending therefrom.

* * * * *